(12) United States Patent
Leck

(10) Patent No.: US 10,144,330 B1
(45) Date of Patent: Dec. 4, 2018

(54) DEPLOYABLE HEADREST

(71) Applicant: Ford Global Technologies, LLC, Dearborn, MI (US)

(72) Inventor: Matthew Graeme Leck, Ruislip (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/964,698

(22) Filed: Apr. 27, 2018

(30) Foreign Application Priority Data

May 24, 2017 (GB) .................................. 1708280.1

(51) Int. Cl.
| | | |
|---|---|---|
| *B60N 2/874* | (2018.01) | |
| *B60N 2/885* | (2018.01) | |
| *B60N 2/02* | (2006.01) | |
| *B60N 2/865* | (2018.01) | |

(52) U.S. Cl.
CPC ........... *B60N 2/874* (2018.02); *B60N 2/0244* (2013.01); *B60N 2/865* (2018.02); *B60N 2/885* (2018.02)

(58) Field of Classification Search
CPC ................................ B60N 2/874; B60N 2/885
See application file for complete search history.

(56) References Cited

U.S. PATENT DOCUMENTS

| | | | | |
|---|---|---|---|---|
| 2,985,229 A * | 5/1961 | Shamblin | ............... | B60N 2/829 297/410 |
| 3,397,911 A * | 8/1968 | Brosius, Sr. | ........... | B60N 2/829 297/216.12 |
| 3,420,572 A * | 1/1969 | Bisland | .................. | B60N 2/002 180/271 |
| 3,454,303 A * | 7/1969 | Dangauthier | .......... | B60N 2/832 297/396 |
| 4,865,388 A * | 9/1989 | Nemoto | ................. | B60N 2/888 297/403 |
| 6,030,036 A * | 2/2000 | Fohl | ...................... | B60R 21/207 297/216.14 |
| 6,192,565 B1* | 2/2001 | Tame | ....................... | B60N 2/20 297/61 |
| 6,213,548 B1* | 4/2001 | Van Wynsberghe | ... | B60N 2/865 297/216.12 |
| 7,367,626 B2* | 5/2008 | Lawall | ............... | B60N 2/42781 297/410 |
| 8,894,142 B2* | 11/2014 | Alexander | ............. | B60N 2/876 297/216.12 |

(Continued)

FOREIGN PATENT DOCUMENTS

| | | |
|---|---|---|
| CN | 204172726 U | 2/2015 |
| DE | 4227697 A1 | 2/1994 |

(Continued)

*Primary Examiner* — Timothy J Brindley
(74) *Attorney, Agent, or Firm* — Vichit Chea; Price Heneveld LLP

(57) ABSTRACT

A deployable headrest assembly for a seat is provided. The headrest assembly includes a headrest slidably coupleable to the seat such that the headrest is movable from a stowed position, in which the headrest is stowed within a seat back of the seat, to a deployable position, in which the headrest extends from the seat back. The headrest is expandable from a collapsed state to an expanded state such that the headrest has a thickness that is larger in the expanded state than in the collapsed state, the headrest being retractable into the stowed position in the seat back when in the collapsed state.

20 Claims, 7 Drawing Sheets

(56) References Cited

U.S. PATENT DOCUMENTS

| | | | |
|---|---|---|---|
| 2006/0170271 A1 | 8/2006 | Coccoli | |
| 2009/0146479 A1* | 6/2009 | Boes | B60N 2/815 |
| | | | 297/391 |
| 2009/0302660 A1* | 12/2009 | Karlberg | B60N 2/885 |
| | | | 297/404 |
| 2010/0123344 A1* | 5/2010 | Villeminey | B60N 2/874 |
| | | | 297/391 |
| 2013/0221722 A1* | 8/2013 | Navarro | B60N 2/885 |
| | | | 297/391 |
| 2015/0197168 A1* | 7/2015 | Hungerford | B60N 2/874 |
| | | | 297/392 |
| 2016/0101716 A1* | 4/2016 | Brecht | B64D 11/0646 |
| | | | 297/397 |
| 2017/0197530 A1* | 7/2017 | Line | B60N 2/885 |
| 2017/0253153 A1* | 9/2017 | Kapusky | B60N 2/853 |
| 2017/0368970 A1* | 12/2017 | Lessard | B60N 2/885 |
| 2018/0065522 A1* | 3/2018 | Muldowney | B60N 2/856 |
| 2018/0105080 A1* | 4/2018 | Dry | B60N 2/874 |

FOREIGN PATENT DOCUMENTS

| | | |
|---|---|---|
| DE | 19722785 A1 | 12/1998 |
| DE | 10136827 C1 | 1/2003 |
| DE | 202006013033 U1 | 12/2006 |
| EP | 1470950 A2 | 10/2004 |
| FR | 2885853 A1 | 11/2006 |
| JP | 2003118462 A | 4/2003 |
| KR | 0159336 B1 | 12/1998 |
| WO | 2013088264 A1 | 6/2013 |

* cited by examiner

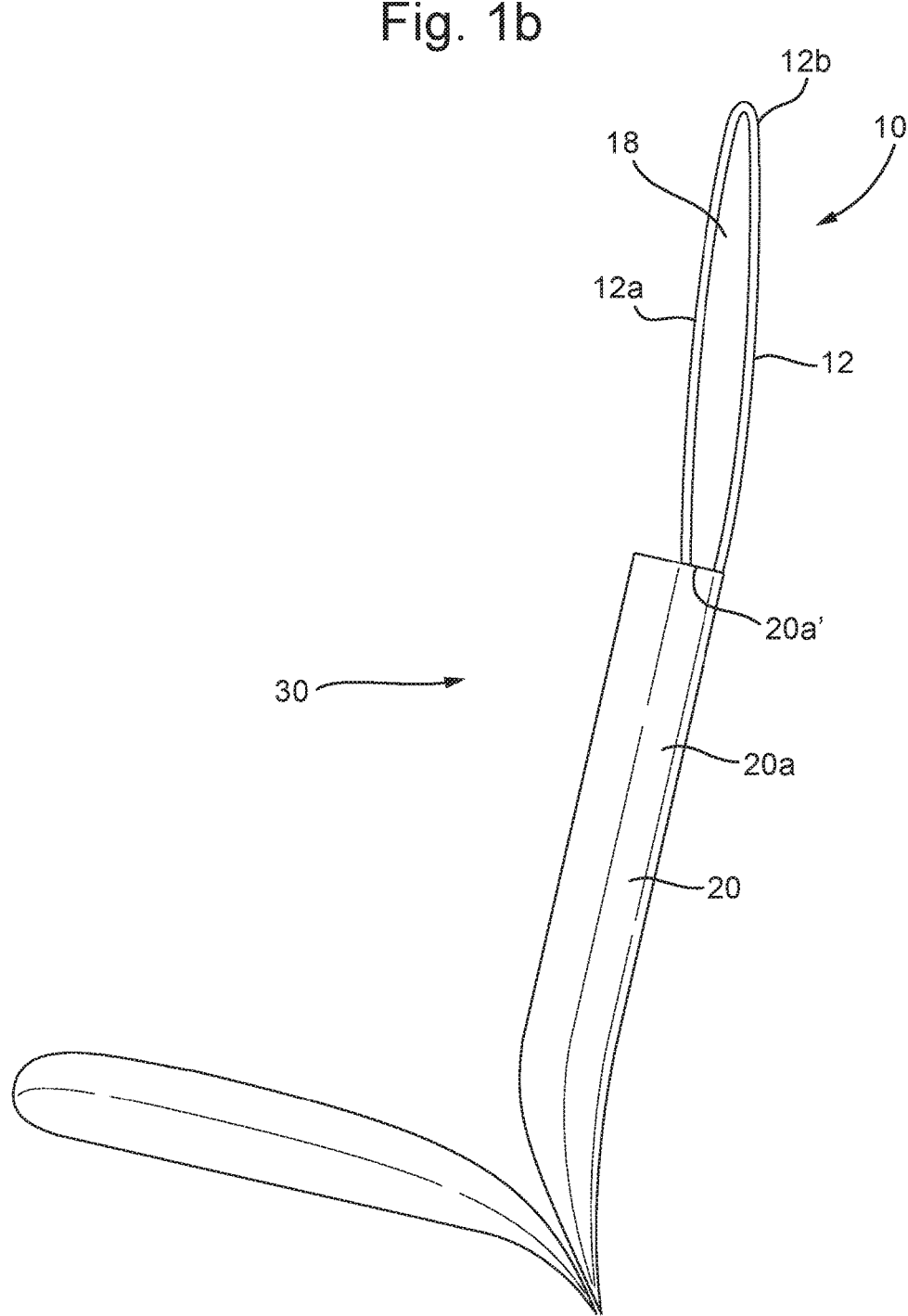

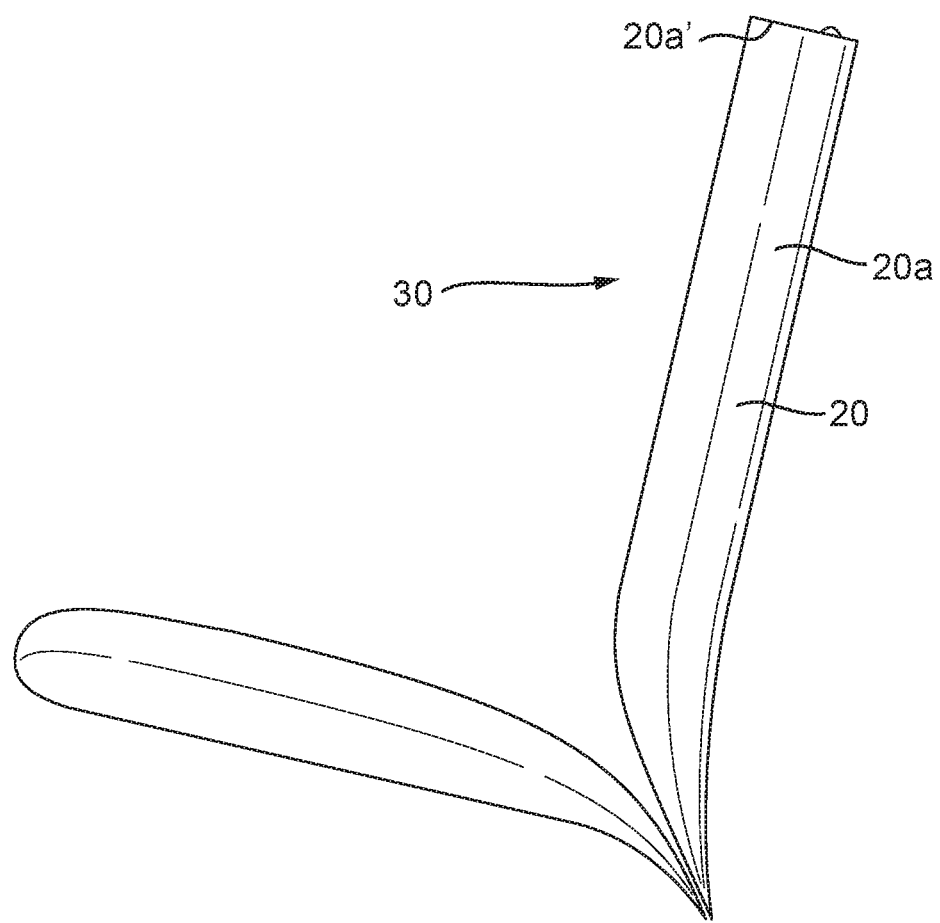

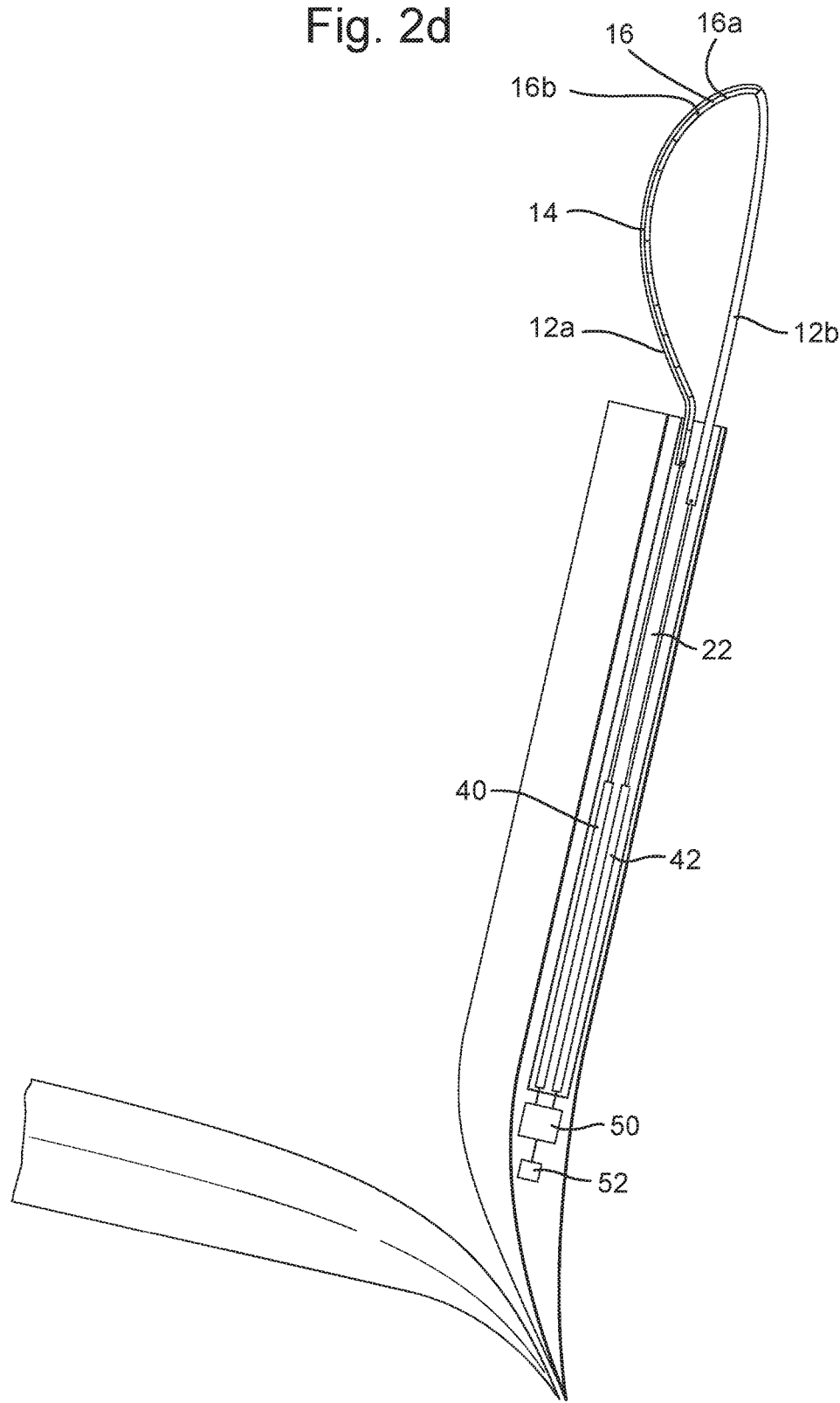

DEPLOYABLE HEADREST

FIELD OF THE INVENTION

The present invention generally relates to a deployable headrest, and more particularly relates to a headrest that is movable from a stowed position stowed within a seat back to a deployed position extending from the seat back.

BACKGROUND OF THE INVENTION

In certain circumstances it is desirable to remove a headrest from a seat in a vehicle, such as a motor vehicle. For example, when folding the rear seats of a motor vehicle to be in a flat position to increase the size of a cargo bay, the headrests from the rear seats may be removed. There may also be other circumstances when it is desirable to remove a headrest. However, the problem then arises as to where to store the headrests when they are not required.

SUMMARY OF THE INVENTION

According to one aspect of the present invention, a deployable headrest assembly for a seat is provided. The deployable headrest assembly for a seat includes a headrest slidably coupleable to the seat and movable from a stowed position, in which the headrest is stowed within a seat back of the seat, to a deployed position, in which the headrest extends from the seat back, wherein the headrest is expandable from a collapsed state to an expanded state such that the headrest has a thickness that is larger in the expanded state than in the collapsed state, the headrest being retractable into the stowed position in the seat back when in the collapsed state, wherein the headrest comprises a collapsible structure configured to collapse and expand between the collapsed and expanded states, and wherein the collapsible structure comprises a flexible membrane and a plurality of wedge-shaped members sequentially arranged on the flexible membrane such that non-parallel wedge surfaces of the wedge shaped members are in successive engagement to define a curved surface when the headrest is in the expanded state. According to another aspect of the present invention, a deployable headrest assembly for a seat is provided. The deployable headrest assembly for a seat includes a headrest slidably coupleable to a seat and movable from a stowed position stowed within a seat back of the seat to a deployed position extending from the seat back, wherein the headrest is expandable from a collapsed state in the stowed position to an expanded state in the deployed position and is retractable into the stowed position when in the collapsed state.

According to a further aspect of the present invention, a seat assembly is provided. The seat assembly includes a seat having a seat back, and a headrest slidably coupleable to the seat and movable from a stowed position stowed within the seat back to a deployed position extending from the seat back, wherein the headrest is expandable from a collapsed state in the stowed position to an expanded state in the deployed position and is retractable into the stowed position when in the collapsed state.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1b is a side view of the seat assembly comprising a deployable headrest assembly according to an arrangement depicting the headrest in an intermediate position;

FIG. 1c is a side view of the seat assembly comprising a deployable headrest assembly according to an arrangement depicting the headrest in a stowed position;

FIG. 2d is a side schematic view of the seat assembly comprising the deployable headrest according to the arrangement depicting the headrest in a deployed position.

DETAILED DESCRIPTION OF THE PREFERRED EMBODIMENTS

Figure 1A:
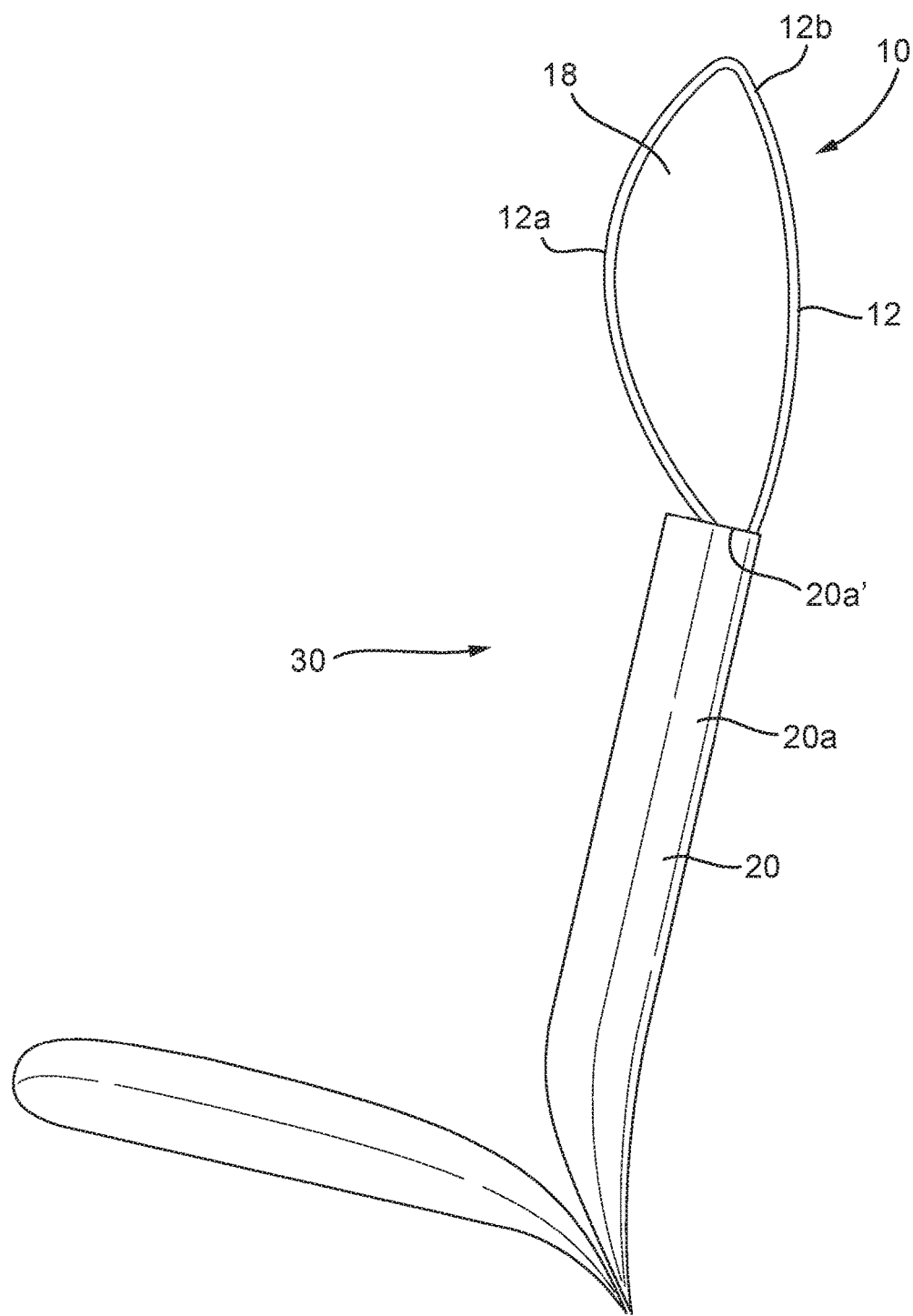
FIG. 1a is a side view of a seat assembly comprising a deployable headrest assembly according to an arrangement depicting the headrest in a deployed position.
Figure 2A:
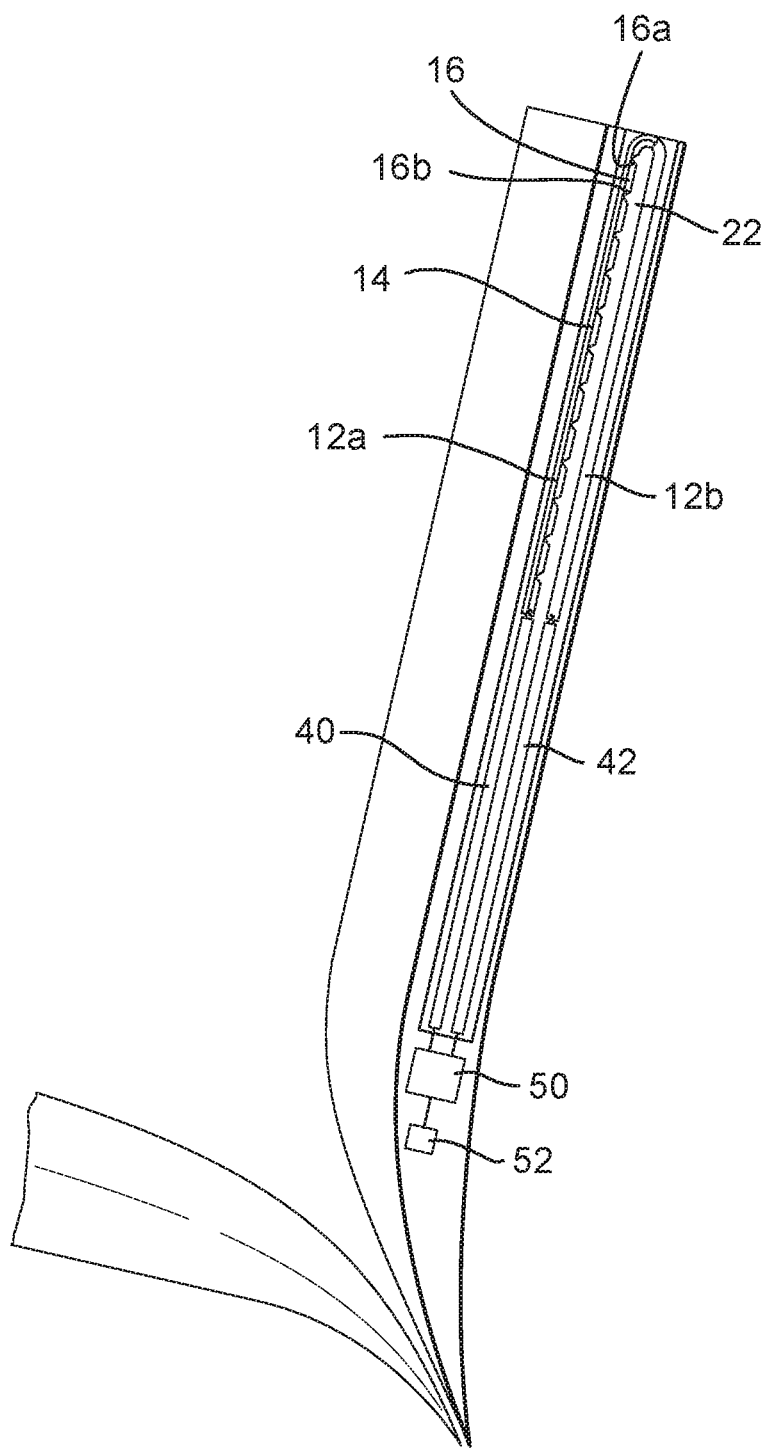
FIG. 2a is a side schematic view of the seat assembly comprising the deployable headrest according to the arrangement depicting the headrest in a stowed position.

With reference to FIGS. 1a-1c and FIGS. 2a-2d, the present disclosure relates to a deployable headrest assembly 10 for a seat 20. The deployable headrest assembly 10 and seat 20 may together form a seat assembly 30. The seat assembly 30 may be provided in a vehicle, such as a motor vehicle. The headrest assembly 10 comprises a headrest 12, which is slidably coupled to the seat 20. The headrest 12 is movable from a stowed position (as depicted in FIGS. 1c and 2a), in which the headrest 12 is stowed within a seat back 20a of the seat 20, to a deployed position (as depicted in FIGS. 1a and 2d), in which the headrest 12 extends from the seat back 20a.

Figure 2B:
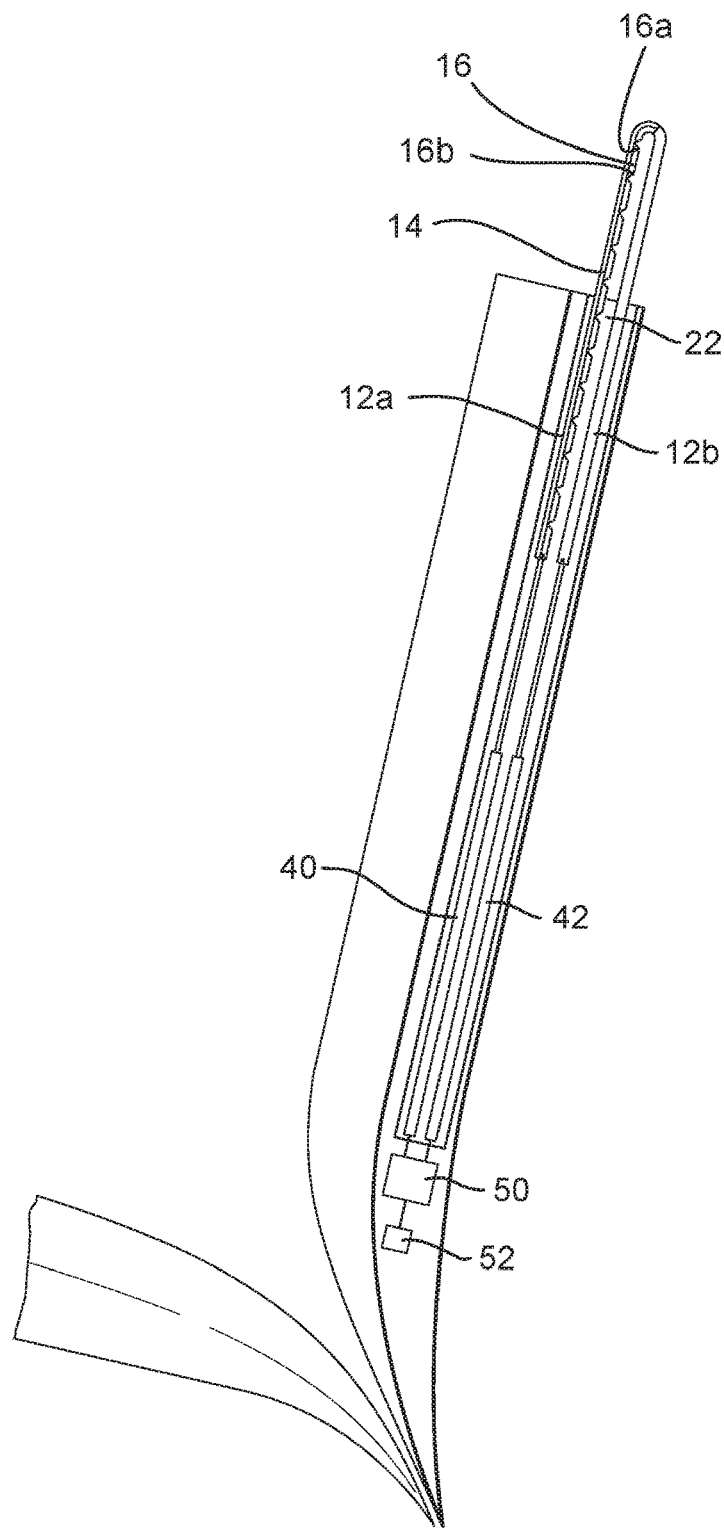
FIG. 2b is a side schematic view of the seat assembly comprising the deployable headrest according to the arrangement depicting the headrest in an intermediate position.

In addition to being slidably disposed with respect to the seat 20, the headrest 12 is expandable from a collapsed state to an expanded state such that the headrest 12 has a thickness that is larger in the expanded state than in the collapsed state. The thickness of the headrest is measured in the fore-aft direction of the seat 20. FIGS. 1a and 2d depict the headrest 12 in the expanded state, whereas FIGS. 1b, 2a, and 2b depict the headrest 12 in the collapsed state.

The seat back 20a comprises a cavity 22, which is sized so as to receive the headrest 12 when in the collapsed state. In particular, the cavity 22 may have a thickness that is less than the thickness of the headrest 12 in the expanded state. The cavity thickness may otherwise be greater than or equal to the thickness of the headrest 12 in the collapsed state. The cavity 22 may have an opening at a top end 20a' of the seat back 20a and the headrest 12 may pass through the opening when moving from the stowed position to the deployed position. It will be appreciated that the headrest 12 may only be retractable into the stowed position in the seat back when the headrest is in the collapsed state. Furthermore, an interaction of the headrest 12 with an edge of the opening may encourage the headrest to move into the collapsed state when the headrest is moved into the stowed position.

Figure 2C:
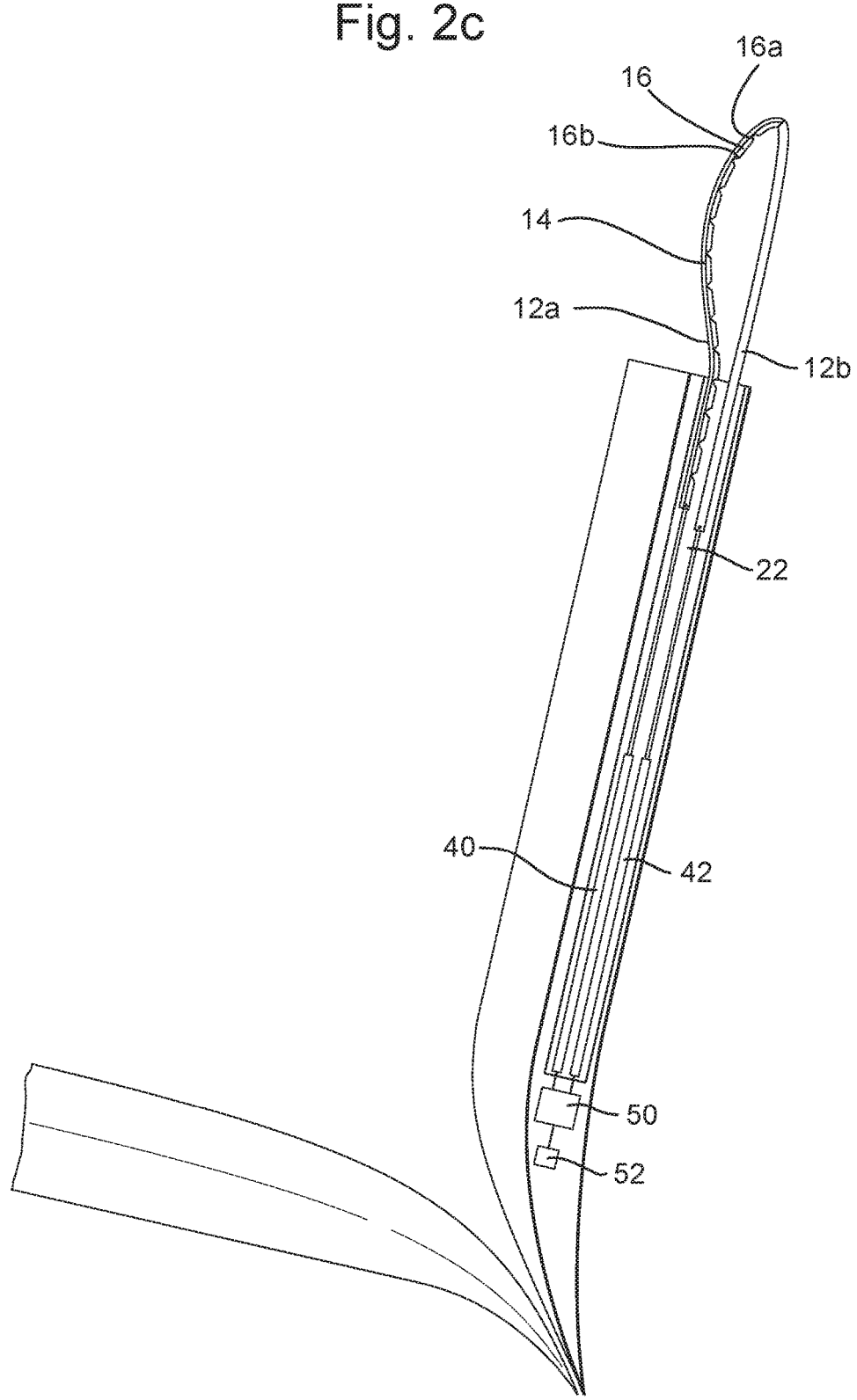
FIG. 2c is a side schematic view of the seat assembly comprising the deployable headrest according to the arrangement depicting the headrest in a further intermediate position.

The headrest 12 comprises a collapsible structure configured to collapse and expand between the collapsed and expanded states. The collapsible structure comprises a flexible membrane 14 and a plurality of elongate wedge shaped members that are sequentially arranged on the flexible membrane. The elongate wedge shaped members 16 may be arranged with a longitudinal axis extending in a lateral direction of the seat 20. Some or all of the wedge shaped members 16 may comprise non-parallel (e.g., tapered) wedge surfaces 16a, 16b on either side of a particular wedge shaped member 16. As depicted in FIG. 2d, the wedge surfaces 16a, 16b may contact the wedge surfaces of a neighboring wedge shaped member 16 when the headrest 12 is in the expanded state. As the wedge surfaces 16a, 16b of at least some of the wedge shaped member 16 may not be parallel, the successive engagement of the wedge shaped members 16 forms a curved surface when the headrest 12 is in the expanded state. By contrast, in the collapsed state depicted in FIGS. 2a and 2b, the corresponding wedge surfaces of neighboring wedge shaped members 16 may be out of engagement such that the flexible membrane 14 and wedge shaped members 16 may form a substantially flat structure. FIG. 2c depicts an intermediate position between the collapsed and expanded states.

The headrest 12 comprises a front portion 12a and a back portion 12b. The front portion 12a comprises the flexible membrane 14 and wedge shaped members 16. The flexible membrane 14 may be connected to the back portion 12b at a top end of the front and back portions 12a, 12b. In contrast to the front portion 12a, the back portion 12b may be substantially rigid. In addition, the back portion 12b may be substantially straight. The back portion 12b may be slidably coupled to the seat back 20a. A bottom end of the front portion 12a may be slidably coupled to the seat back 20a.

In the expanded state, the front and back portions 12a, 12b of the headrest may form a loop that encloses a void 18 between the front and back portions 12a, 12b. The void 18 may be a space that may be filled with air. In the collapsed state, the void 18 may be reduced in size and may be substantially absent altogether. The headrest 12 may be open at lateral ends of the headrest such that the void 18 extends through a width of the headrest when in the expanded state.

Referring still to FIGS. 2a-2d, the headrest assembly 10 may comprise at least one actuator configured to move the headrest 12 between the stowed and deployed positions. In the particular example shown, the headrest assembly 10 comprises a first actuator 40 and a second actuator 42. The first and second actuators 40, 42 may be linear actuators or they may be any other type of actuator that is configured to move the headrest 12 between the stowed and deployed positions. In the depicted arrangement, the second actuator 42 is connected to the back portion 12b of the headrest 12 and is configured to move the back portion 12b in an upwards direction to move the headrest 12 from the stowed position to the deployed position. In a similar manner, the first actuator 40 is connected to a bottom end of the front portion 12a of the headrest 12 and is configured to move the front portion upwards as the headrest 12 moves from the stowed position to the deployed position. The first actuator 40 may also move the front portion 12a upwards relative to the back portion 12b so as to cause the headrest 12 to move into the expanded state.

In an alternative arrangement (not shown), one of the actuators may be omitted. For example, the second actuator 42 may be omitted and the first actuator 40 may drive the upwards motion of both the front and back portions 12a, 12b. Once the back portion 12b has reached the limit of its upper travel, the first actuator 40 may continue to cause the front portion 12a to move upwards relative to the back portion 12b and thus expand the headrest 12.

The front and back portions 12a, 12b of the headrest 12 may be guided in their travel by one or more guides in the seat 20 that the front and back portions engage with. The travel of the front and back portions 12a, 12b may be limited by end stops (not shown).

The actuators 40, 42 may lockingly hold the front and back portions in the stowed and/or deployed positions. Additionally or alternatively, separate actuatable locks may be provided to selectively hold the front and back portions in place.

The actuators 40, 42 may be further configured to adjust a height of the headrest 12 relative to the seat back 20a. In particular, in the deployed position of the headrest 12 the first and second actuators 40, 42 may further raise the front and back portions 12a, 12b together to suit the preferences of an occupant of the seat 20. Additionally or alternatively, the first and/or second actuators 40, 42 may adjust the thickness of the headrest 12. For example, relative movement of the front portion and back portion 12a, 12b may change the thickness of the headrest 12. The wedge shaped members may be formed from a resilient material, which may allow adjustment of the thickness of the headrest in the expanded state. Additionally or alternatively, the flexible membrane 14 may comprise a resilient material to provide a soft surface for the head of a seated occupant to rest upon.

The headrest assembly 10 may further comprise a controller 50 configured to control the first and/or second actuators 40, 42. The controller 50 may be a shared controller or a controller dedicated to seat assembly controls and may include a microprocessor and memory or other analog and/or digital circuitry. The headrest assembly 10 may further comprise a user interface 52, which is operatively connected to the controller 50. The user interface 52 may allow the occupant of the seat 20 to select the stowed or deployed position of the headrest 12 by entering an input. Furthermore, the user interface 52 may also allow the occupant of the seat to select the height and/or thickness of the headrest 12.

According to the present disclosure, there is provided a deployable headrest assembly for a seat, the headrest assembly comprising a headrest slidably coupleable to the seat such that the headrest is movable from a stowed position, in which the headrest is stowed within a seat back of the seat, to a deployed position, in which the headrest extends from the seat back. The headrest is expandable from a collapsed state to an expanded state such that the headrest has a thickness that is larger in the expanded state than in the collapsed state, the headrest being retractable into the stowed position in the seat back when in the collapsed state. The headrest comprises a collapsible structure configured to collapse and expand between the collapsed and expanded states, wherein the collapsible structure comprises a flexible membrane and a plurality of wedge-shaped members sequentially arranged on the flexible membrane such that non-parallel wedge surfaces of the wedge shaped members are in successive engagement so as to define a curved surface when the headrest is in the expanded state. The wedge shaped members may correspond to the voussoirs of an arch. By contrast, the wedge-shaped members may be arranged on the flexible membrane such that the non-parallel wedge surfaces of the wedge shaped members may be out of engagement in the collapsed state.

The headrest may comprise a front portion and a back portion. The front portion may comprise the flexible membrane and wedge-shaped members. The flexible membrane may be connected to the back portion at a top end of the front and back portions. The back portion may be substantially rigid. A bottom end of the front portion may be slidably coupled to the seat back. The back portion may be slidably coupled to the seat back.

There may be a void, e.g., space, between the front and back portions when the headrest is in the expanded state. The void may be smaller or substantially absent when the headrest is in the collapsed state. The headrest may be open at lateral ends of the headrest, such that the void extends through a width of the headrest when in the expanded state.

The headrest assembly may comprise at least one actuator, such as a linear actuator, configured to move the headrest between the stowed and deployed positions. The actuator may be arranged so as to cause the back portion to move upwards when the headrest moves from the stowed position to the deployed position. The actuator or a further actuator may be arranged so as to cause a bottom end of the front portion to move upwards relative to the back portion so that the headrest moves into the expanded state.

The actuator may be configured to adjust a height of the headrest relative to the seat back. The actuator may adjust the height of headrest relative to the seat back by adjusting the height of the back portion. The actuator or further actuator may adjust the thickness of the headrest by varying the extent of relative movement between the front and back portions.

The headrest assembly may further comprise a controller configured to control the actuator. The headrest assembly may further comprise a user interface for a user to select the stowed or deployed position of the headrest. The user interface may be in communication with the controller. The user interface may also allow the user to select the height and/or thickness of the headrest.

The deployable headrest assembly may be employed on a seat assembly. The seat assembly may be used on a vehicle such as a motor vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A deployable headrest assembly for a seat, comprising:
a headrest slidably coupleable to the seat and movable from a stowed position, in which the headrest is stowed within a seat back of the seat, to a deployed position, in which the headrest extends from the seat back,
wherein the headrest is expandable from a collapsed state to an expanded state such that the headrest has a thickness that is larger in the expanded state than in the collapsed state, the headrest being retractable into the stowed position in the seat back when in the collapsed state;
wherein the headrest comprises a collapsible structure configured to collapse and expand between the collapsed and expanded states; and
wherein the collapsible structure comprises a flexible membrane and a plurality of wedge-shaped members sequentially arranged on the flexible membrane such that non-parallel wedge surfaces of the wedge shaped members are in successive engagement to define a curved surface when the headrest is in the expanded state.

2. The deployable headrest according to claim 1, wherein the wedge-shaped members are arranged on the flexible membrane such that the non-parallel wedge surfaces of the wedge shaped members are out of engagement in the collapsed state.

3. The deployable headrest according to claim 1, wherein the headrest comprises a front portion and a back portion.

4. The deployable headrest according to claim 3, wherein the front portion comprises the flexible membrane and wedge-shaped members.

5. The deployable headrest according to claim 4, wherein the flexible membrane is connected to the back portion at a top end of the front and back portions.

6. The deployable headrest according to claim 3, wherein the back portion is substantially rigid.

7. The deployable headrest according to claim 3, wherein there is a void between the front and back portions when the headrest is in the expanded state and the void is substantially absent when the headrest is in the collapsed state.

8. The deployable headrest according to claim 7, wherein the headrest is open at lateral ends of the headrest such that the void extends through a width of the headrest when in the expanded state.

9. The deployable headrest according to claim 3, wherein a bottom end of the front portion is slidably coupleable to the seat back.

10. The deployable headrest according to claim 3, wherein the back portion is slidably coupleable to the seat back.

11. The deployable headrest according to claim 1, wherein the headrest assembly comprises at least one actuator configured to move the headrest between the stowed and deployed positions.

12. The deployable headrest according to claim 11, wherein the at least one actuator is arranged so as to cause a back portion of the head rest to move upwards when the headrest moves from the stowed position to the deployed position.

13. The deployable headrest according to claim 12, wherein the at least one actuator or a further actuator is arranged so as to cause a bottom end of a front portion of the head rest to move upwards relative to the back portion so that the headrest moves into the expanded state.

14. The deployable headrest according to claim 11, wherein the at least one actuator is configured to adjust a height of the headrest relative to the seat back.

15. The deployable headrest according to claim 11, wherein the at least one actuator is configured to adjust the thickness of the headrest.

16. The deployable headrest according to claim 11, wherein the headrest assembly further comprises a controller configured to control the at least one actuator.

17. The deployable headrest according to claim 16, wherein the headrest assembly further comprises a user interface for a user to select the stowed or deployed position of the headrest, the user interface being in communication with the controller.

18. The deployable headrest according to claim 1, wherein the seat is a vehicle seat.

19. A deployable headrest assembly comprising: a headrest slidably coupleable to a seat and movable from a stowed position stowed within a seat back of the seat to a deployed position extending from the seat back, the headrest comprising wedge-shaped members arranged on a flexible membrane expandable from a collapsed state in the stowed position to an expanded state in the deployed position retractable into the stowed position when in the collapsed state.

20. A seat assembly comprising: a seat having a seat back; and a headrest slidably coupleable to the seat and movable from a stowed position stowed within the seat back to a deployed position extending from the seat back, the headrest comprising wedge-shaped members arranged on a flexible membrane expandable from a collapsed state in the stowed position to an expanded state in the deployed position retractable into the stowed position when in the collapsed state.

* * * * *